United States Patent [19]
Kohn

[11] 3,777,187
[45] Dec. 4, 1973

[54] CONTROLLER CIRCUIT

[75] Inventor: Mitchell I. Kohn, Chicago, Ill.

[73] Assignee: Love Controls Corporation, Wheeling, Ill.

[22] Filed: May 1, 1972

[21] Appl. No.: 249,287

[52] U.S. Cl................ 307/310, 219/494, 219/499, 219/501, 307/296
[51] Int. Cl............................ H03k 5/20, H01v 1/00
[58] Field of Search........................... 307/310, 296; 219/494, 499, 501, 505

[56] References Cited
UNITED STATES PATENTS

| | | | |
|---|---|---|---|
| 3,632,985 | 1/1972 | Bare et al. | 219/499 |
| 3,386,498 | 6/1968 | Funfstuck | 307/310 X |
| 3,523,182 | 8/1970 | Phillips et al. | 219/501 |
| 3,604,957 | 9/1971 | Satula | 307/310 |
| 3,643,108 | 2/1972 | Pilkington | 307/310 X |

Primary Examiner—John Zazworsky
Attorney—Irvin C. Alter et al.

[57] ABSTRACT

Temperature controllers including a sensing device, such as a thermocouple which is temperature compensated by means of a negative temperature coefficient resistance, and which generates a signal in response to the temperature of the thermocouple junction; an output circuit for manifesting a first output when a temperature limit is not exceeded and a second output when the limit is exceeded; a circuit which senses power interruption and forces the output circuit to manifest the first output for a limited time after the power is restored; and an alternative output circuit which provides a proportional controlling signal in response to the sensed temperature.

11 Claims, 3 Drawing Figures

CONTROLLER CIRCUIT

BACKGROUND OF THE INVENTION

This invention relates to a controller circuit and more particularly to a controller circuit adapted to produce an indicating signal in response to detection, at a remote location, of a parameter exceeding a predetermined value. The invention also relates to proportioning controller circuits.

Electronic controller apparatus are commonly used as a part of systems for controlling temperature, either the temperature within a closed system or at one or more steps of a continuous process which is temperature sensitive. Typical uses of such controllers are in connection with the operation of heating elements in a furnace or in connection with the control of refrigeration equipment.

Other uses of such controllers include detection of when a limiting condition such as a maximum temperature limit is exceeded. When so used, it is frequently necessary to shut down the equipment being operated until a malfunction is corrected.

Control circuits heretofore known have been handicapped in their inability to deal with abnormal circumstances such as interruption of power to the machinery being controlled. For example, if the limit responsive circuit detects a limit condition and manifests that by the operation of a relay, interruption of power and a subsequent reapplication of power may cause the relay falsely to remain unenergized even though the limit condition may remain exceeded. In other cases, interruption and restoration of power may cause the relay falsely to indicate a limit condition when in fact none has occurred.

Previously known control circuits have also been limited with respect to the sensitivity of control which can be applied to machinery being controlled, in that relatively complicated circuits have been necessary for effecting proportional control to turn on and off a control signal in response to the value of a sensed parameter. If a relatively large temperature range is provided between the temperature at which the control signal is energized, and the temperature at which the control signal is de-energized, i. e., a relatively great hysteresis is provided, the temperature being controlled is free to assume any value within that range. If the hysteresis is made smaller, the sensitivity is increased, but undesirable oscillation may occur if the sensitivity is increased by more than a predetermined amount.

Previous circuits for temperature control have also been limited in the accuracy with which they can respond to changes in the temperature which is to be regulated, especially when thermocouples are employed. As the voltage produced by a thermocouple is a function of the difference in temperature between two junctions, failure to compensate for differences in temperature at one of the junctions results in inaccuracies. Efforts in the past to eliminate variable temperatures at the reference junction as a source of error have resulted in rather cumbersome assemblies in which the temperature at the reference junction was made fixed. One method commonly used has been to place the reference junction in a bath of ice and water. It is desirable to provide a temperature sensor in which variations in the temperature of the reference junction is automatically compensated for so that the output voltage is solely dependent upon the temperature of the sensing junction without actually holding the reference junction to a fixed temperature.

Accordingly, it is a principal object of the present invention to provide a controller having means for causing a limit control to assume a known condition immediately upon resumption of power following an unexpected interruption in power, and thereafter to change to its other condition only if the limit remains exceeded following decay of all transients resulting from reapplication of power to the control apparatus.

It is a further object of the present invention to provide a controller having a mechanism which is normally disabled when there is a normal application of power to the controller, but enabled immediately when the power has been resumed after an interruption, and disabled again a short interval later.

Another object of the present invention is to provide a controller for producing a control signal in response to the value of a sensed parameter in which the amount of hysteresis in the operation of the control circuit is independent of the value of the parameter.

A further object of the present invention is to provide a proportioning controller in which the duty cycle of the proportional controlling signal is modified in accordance with the level of the sensed parameter.

Another object of the present invention is to provide a controller having means for producing a signal proportional to the temperature at a remote location, independently of the value of a reference temperature.

A further object of the present invention is to provide means for sensing the temperature at a remote location, and for automatically compensating for the temperature at another location so that the value of the output signal produced in response to the temperature at the remote location is independent of changes in the temperature at the other location.

Another object of the present invention is to provide a controller having apparatus for sensing the temperature at a remote location and manifesting a first output signal if the remote temperature is greater than a first predetermined value and for manifesting a different signal when the temperature at a remote location is less than a second predetermined value, and means for restoring one of said first or second signals following a time interval subsequent to resumption of power following an interruption.

An additional object of the present invention is to provide a controller fulfilling the above-named objects which is further characterized by versatility of application, economy of construction, stability of operation and simplicity of design.

These and other objects of the present invention will become manifest upon an examination of the accompanying drawings and the following description.

SUMMARY OF THE INVENTION

In accordance with one aspect of the present invention there is provided, in a control circuit of the type described, circuit means for manifesting an output signal in response to the exceeding of a limit condition, means for detecting a power interruption, said detecting means being connected to said circuit means for furnishing a signal thereto following the resumption of power to cause said circuit means to manifest a signal indicative of a condition in which said limit condition has not been exceeded, and means to disable said detection means following a predetermined interval after the resumption of power for enabling said circuit means to manifest an output signal indicative of a limit condition if the limit condition remains exceeded after said predetermined interval.

In accordance with another aspect of the present invention there is provided circuit means for alternately manifesting first and second output signals, the duty cycle of said output signals being variable in response to the difference between the amplitude of an input signal, and a reference signal.

In accordance with a further feature of the present invention there is provided a thermocouple adapted to be placed in a remote location where the temperature is to be measured, a resistance bridge connected with said thermocouple and operative to produce an output voltage in response to the voltage generated by said thermocouple, a negative temperature coefficient component located in thermal proximity to the connection between said thermocouple and said bridge, and means connecting said component with said bridge, said component automatically compensating for the temperature of the junction of said thermocouple with said bridge to produce an output signal which is independent of the temperature of said junction.

BRIEF DESCRIPTION OF THE DRAWINGS

Reference will now be made to the accompanying drawings in which.

DESCRIPTION OF THE INVENTION

Figure 1:
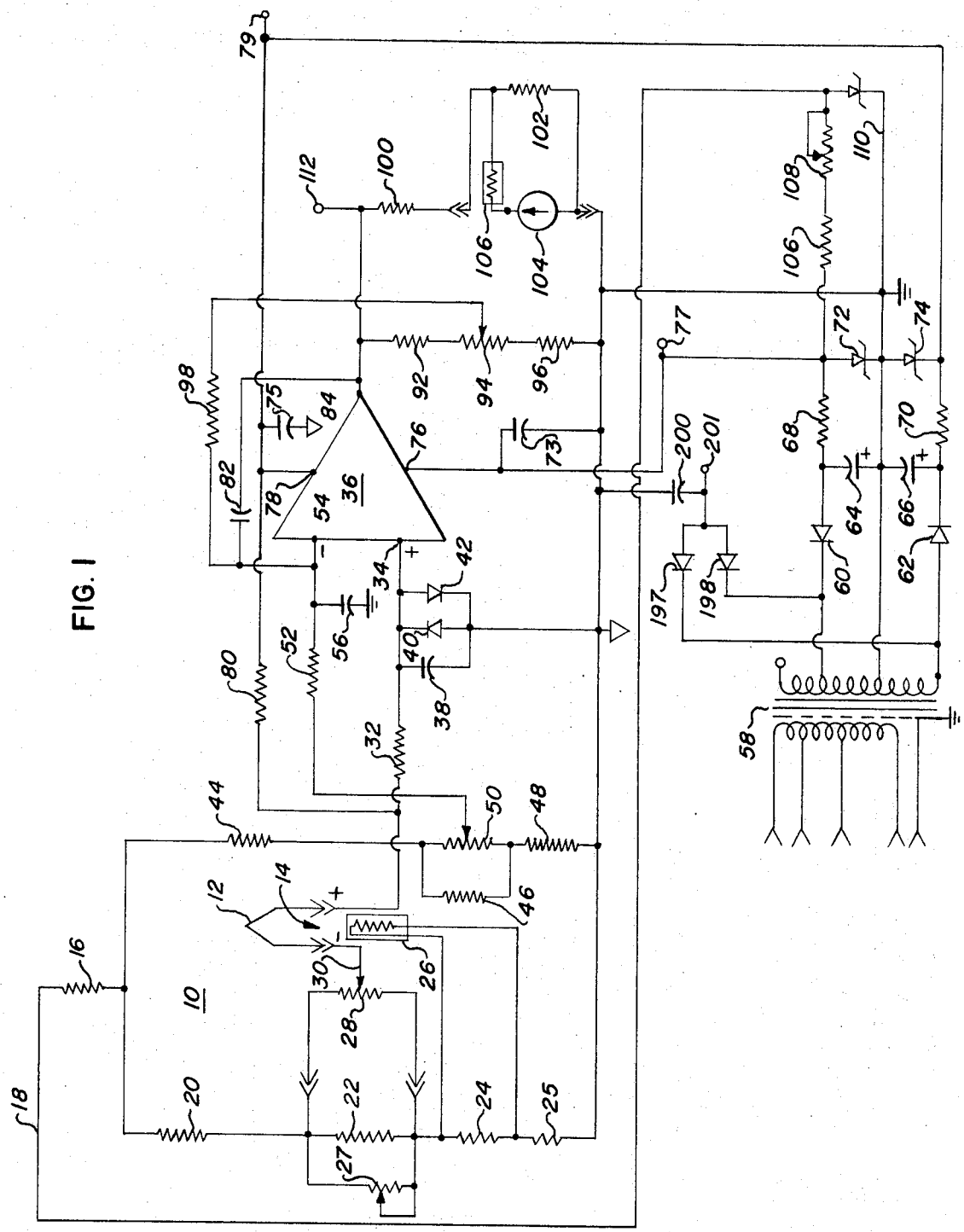
FIG. 1 is an illustration in schematic form of a portion of a controller circuit embodying the present invention.

Referring now to FIG. 1 there is illustrated a temperature measuring bridge 10 having a thermocouple 12 connected by means of a connector 14 with the remainder of the circuit. The connector 14 permits the thermocouple 12 to be removed and replaced with another element if necessary. Thermocouple 12 is suitably disposed to sense the desired temperature. The bridge 10 includes a first resistor 16 connected to a line 18 which is in turn connected to a source of negative potential. The series combination of resistor 16 and resistors 20, 22, 24 and 25 connect line 18 to a common ground circuit point. A negative temperature coefficient thermistor 26 is connected in parallel with the resistor 24, and the thermistor is physically positioned close to, and in thermal contact with, the connector 14 so that it assumes the same temperature as that of the junction between the thermocouple leads and the conductors of the connector 14 and any other electrical junction of dissimilar metallic materials associated with connector 14.

The resistor 22 has a rheostat 27 connected in parallel therewith, by which the range or span of temperatures to be measured may be set. A potentiometer 28 is also connected in parallel with the resistor 22, and its tap is connected by way of the line 30 through the connector 14 to one lead of the thermocouple 12. Potentiometer 28 provides a circuit adjustment by which the user may adjust the controller set point, i. e., either the limit temperature to which the controller is to respond or the value at which it is desired to maintain the sensed temperature. The other lead of the thermocouple 12 is connected through the connector 14 and by means of a resistor 32 to the noninverting input 34 of an operational amplifier 36. A capacitor 38 is connected from the input 34 to ground, to act as a low pass filter, and a pair of reverse-poled diodes 40 and 42 are connected in parallel with the capacitor 38, to limit the amplitude of signals applied to the input terminal 34.

A resistor 44 is connected to the junction of the resistors 16 and 20 and leads from that junction through a resistor 46 and a resistor 48 to ground. A potentiometer 50 is connected in parallel with the resistor 46 and the tap of the potentiometer 50 is connected through a resistor 52 to the inverting input 54 of the operational amplifier 36. A capacitor 56 connects the input 54 to ground to bypass high frequency components.

The operational amplifier 36 is powered by positive and negative voltages derived from a power transformer 58. The primary winding of transformer 58 may include a plurality of taps to permit operation of the controller with a plurality of different line voltages. The transformer also includes an electrostatic shield for connection to earth ground. The secondary winding of the transformer 58 is connected to two half wave rectifier circuits incorporating diodes 60 and 62 and capacitors 64 and 66, arranged as shown in FIG. 1. The voltage appearing across the capacitors 64 and 66 is dropped by resistors 68 and 70 and stabilized by a pair of zener diodes 72 and 74. The anode of the zener diode 72, where the negative voltage appears, is connected to the negative power terminal 76 of the operational amplifier 36 while the cathode of the zener diode 74, where the positive voltage appears, is connected to the positive power terminal 78 of the operational amplifier 36. Capacitors 73 and 75 connect terminals 76 and 78, respectively, of operational amplifier 36 to ground, thus bypassing any a.c. signals which might otherwise be present at these terminals to ground, neutralizing lead inductances, and improving the stability of the amplifier.

A resistor 80 is connected from the terminal 78 to the junction of the thermocouple 12 and the resistor 32. Resistor 80 is of relatively high impedance relative to the impedances of bridge circuit 10 and operates to apply a relatively high voltage to noninverting input 34 of the amplifier 36 should the leads to thermocouple 12 break, thus causing the controller output to indicate that the sensed temperature has gone beyond the set point value, either tripping an alarm signal or shutting down the controlled process depending on the use made of the controller output. A capacitor 82 is connected from the output terminal 84 of the amplifier 36 to its inverting input terminal 54 to suppress high frequency signals.

The output terminal 84 is connected to a terminal 112, and through a resistor 92, a potentiometer 94 and a resistor 96 to ground. The tap of the potentiometer 94 is connected through a resistor 98 to the inverting input 54 of the amplifier 36, to provide negative feedback to establish the gain of the amplifier. The output is also connected to a circuit including series connected resistors 100 and 102 to ground. A meter 104 is connected in series with a thermistor 106 across the resistor 102 and is arranged to indicate the voltage present at the output terminal 84. The appropriate voltage range is obtained by selecting the appropriate values for the resistors 100 and 102 and thermistor 106, as is well known by those skilled in the art. Thermistor 106 compensates for variations in the resistance of the coil in meter 104 with temperature. The gain of the amplifier 36 is adjustable by means of the potentiometer 94, to calibrate the meter 104 with respect to a scale indicating the number of degrees that the temperature at the location of the thermocouple 12 differs from the temperature set by the potentiometer 28.

The amplifier 36 functions as a differential amplifier that amplifies the difference in the voltage, if any, between a first potential supplied by the potentiometer 50, and a second potential formed by the addition of the potential selected by the tap of potentiometer 28 to the potential produced by the thermocouple 12. When the first and second potentials are equal, there is no difference between the inputs 34 and 54 and the output of the amplifier 36 vanishes.

In calibrating the apparatus of FIG. 1, the potentiometer 28 is adjusted so that the dial associated with the potentiometer 28 reads the existing temperature of the thermocouple 12. For the purpose of calibration, the temperature of the thermocouple 12 may be stabilized at some known temperature by means not shown or a suitable equivalent potential source may be interposed therefor. Then, the potentiometer 50 is adjusted so that the output of the amplifier 36 at the terminal 84 vanishes, as determined by the meter 104. The setting of the potentiometer 28 is then changed by a few degrees, and the gain of the amplifier is adjusted, by means of the potentiometer 94, until the deviation meter 104 indicates the number of degrees as the difference between the dial on the potentiometer 28 and the fixed temperature of the thermocouple. The circuit is thus brought into balance. The meter 104 will show the deviation, in degrees, between the temperature of the thermocouple 12 and the setting of the potentiometer 28. The output of the amplifier 36 is an error signal which is employed to energize heating or cooling systems so that the temperature at the thermocouple 12 is brought into conformity with the setting of the potentiometer 28. As will be apparent, other schemes may be used to calibrate the circuit of FIG. 1.

The voltage on the line 18 is obtained by a circuit including a resistor 106 in series with a rheostat 108 and a zener diode 110, all connected across the zener diode 72. The line 18 is connected to the junction of the rheostat 108 and the zener diode 110 which may advantageously be a temperature compensated zener diode. The rheostat 108 is employed to adjust the current flowing through the zener diode 110 to optimize the compensation of zener diode 110 and the regulation on the line 18. It will be appreciated that the voltage on the line 18 is very stable because of its being obtained by two zener diodes connected in cascade.

Figure 2:
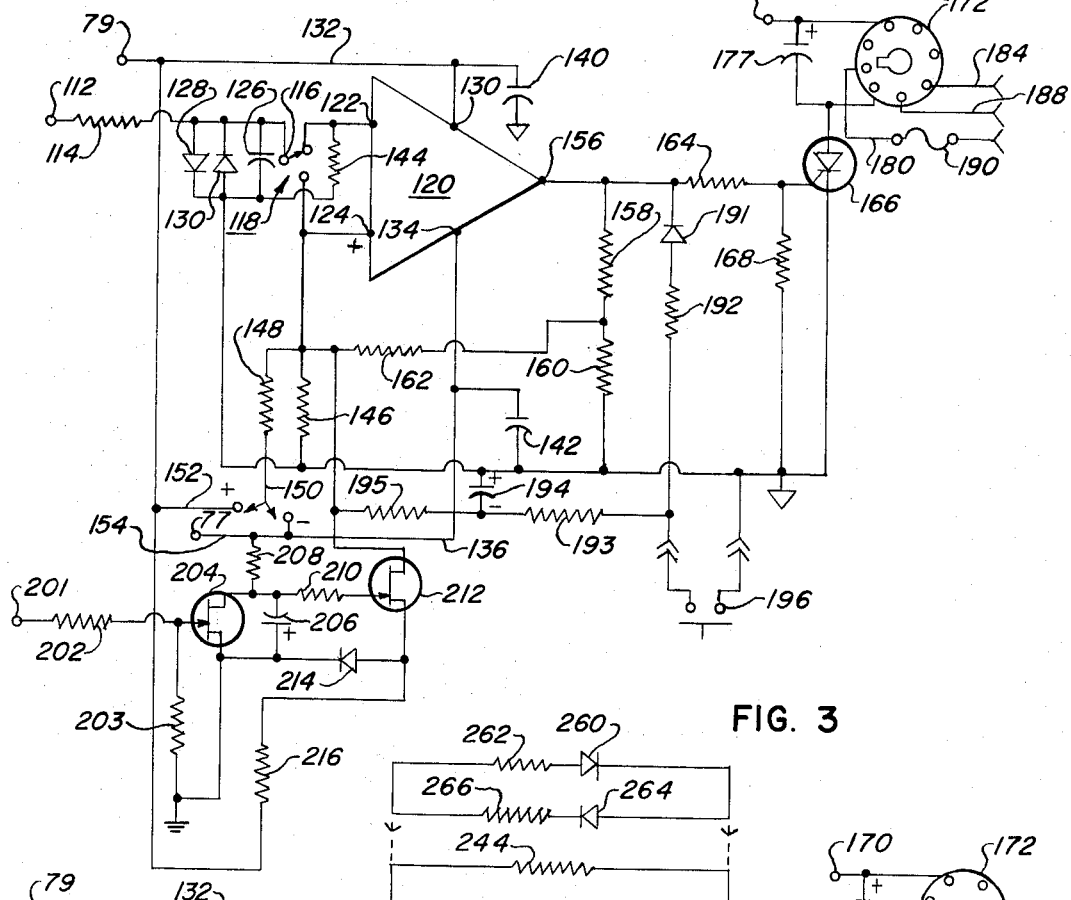
FIG. 2 is an illustration in schematic form of an additional portion of a first embodiment of the present invention, which cooperates with the apparatus of FIG. 1.

Referring now to FIG. 2, the terminal 112 is connected through a resistor 114 to the terminal 116 of a single pole double throw switch 118. A jumper system may be used in place of switch 118. The switch 118 connects the signal from the terminal 116 to one or the other inputs of an operational amplifier 120. The inverting input 122 of the amplifier 120 is connected to one position of the switch 118 and the noninverting input 124 is connected to the other position of the switch 118. A capacitor 126 is connected between the terminal 116 and ground to provide a bypass, and reverse poled diodes 128 and 130 are connected in parallel with the capacitor 126 to limit the maximum signal which can be applied to the amplifier 120. Positive voltage is applied to the positive power terminal 130 by means of a lead 132 connected with the terminal 78 of the amplifier 36 (FIG. 1), via terminal 79.

Similarly, the negative power terminal 134 is connected to the negative power terminal 76 of the amplifier 36, via terminal 77, by means of a line 136. Capacitors 140 and 142 connect terminals 130 and 134, respectively, of operational amplifier 120 to ground and perform functions similar to those of capacitors 73 and 75 in FIG. 1.

A resistor 144 is connected from the inverting input 122 to ground, and a resistor 146 is connected from the noninverting input 124 to ground. A further resistor 148 is connected from the noninverting input 124 to a lead 150, which is connected either to a source of positive potential via a line 152, or to a source of negative potential via a line 154, as required, and the value of the resistor 148 is selected to change the output of the amplifier 120, to the first condition, as defined below, when a zero level signal is applied to terminal 112. The output of the amplifier 120 is provided at an output terminal 156. A voltage divider including resistors 158 and 160 is connected from the terminal 156 to ground, and a resistor 162 is connected from the junction of the resistors 158 and 160 to the noninverting input 124, in order to provide positive feedback. The provision of the feedback resistor 162 makes the amplifier 120 stable in one of two conditions depending upon the value of the input signal supplied from the terminal 112. In the first or operated condition, the voltage at output terminal 156 is approximately that of the negative supply at power terminal 134, while in the second or unoperated condition, the voltage at output terminal 156 is approximately that of the positive supply at power terminal 130. The switch 118 determines whether the amplifier 120 is operated for temperatures above a given limit, or for temperatures below a given limit. Considering the case where the switch 118 connects the terminal 112 to the inverting input 122, the amplifier 120 is normally in the second condition for temperatures below a given limit. As the temperature sensed by the thermocouple 12 rises, the voltage level at the terminal 112 rises, and the amplifier 120 assumes the first condition, the signal at the output terminal 156 then falling sharply. Positive feedback through the resistor 162 functions to maintain the amplifier 120 in its first condition, even if the temperature should fall slightly thereafter. The amplifier 120 is returned to its second condition only when the voltage level present at the terminal 112 falls to a value below the threshold value required for operating the amplifier 120. The positive feedback accordingly establishes some hysteresis in the operation of the amplifier 120 which prevents it from oscillating in response to slight changes in temperature. If a low limit is desired, the switch 118 is operated to its other condition, so that a negative signal is required to operate the amplifier 120. A less negative signal is then required to restore the amplifier 120 to its second condition.

The output terminal 156 is connected through a resistor 164 to the gate terminal of a silicon controlled rectifier (SCR) 166. The cathode of the SCR 166 is connected to ground and its gate and cathode are connected together by a resistor 168. When amplifier 120 is in its second condition (positive potential at terminal 156), the SCR 166 is conductive, and current flows from a source of a.c. potential connected from a terminal 170 through a connector 172, a line 174, the coil of a relay 176, and back through the connector 172 to the anode of the SCR 166. When the amplifier 120 is in its first condition (negative potential at terminal 156), the SCR 166 is cut off at the end of a positive half cycle of the a.c. voltage. A capacitor 177 is connected across the coil of the relay 176 to prevent relay chatter and insure that the relay coil remains energized during the on-half cycles of power flow that SCR 166 is nonconductive.

The relay 176 has a common terminal 178 which is connected through the connector 172 to a line 180. A normally closed circuit extends from the common terminal 178 via line 182 through the connector 172 to a line 184. A normally open circuit, closed when the coil of the relay 176 is energized, includes a line 186 which connects through the connector 174 with a line 188. The line 180 is connected to a source of power through a fuse 190, and the lines 184 and 188 are connected to furnish power to other apparatus used with the control circuit of the present invention, such as heating or cooling apparatus, indicator apparatus, or the like.

In operation the circuit of FIG. 2 functions to change the state of the amplifier 120 from its second condition to its first condition when a limit has been exceeded, the sign of the limit condition being set by the switch 118. If a power interruption should occur, reapplication of power after a short interval can place the amplifier 120 in either of its two stable conditions, primarily as a matteer of chance, because there is a generally random order in the sequence of which various parts of the control circuit are brought up to operating voltage. It is desirable to provide a means for insuring that the second condition is assumed by the amplifier 120, following resumption of power, in order to prevent the power resumption from having the effect of signaling a limit condition when none exists.

The amplifier 120 has an additional circuit for applying positive feedback when the amplifier 120 is in its first condition. This comprises a series circuit connected from the terminal 156 to ground, including a diode 191, a resistor 192, another resistor 193, and a capacitor 194. A resistor 195 connects the junction of the resistor 193 and the capacitor 194 to the noninverting input 124. When the amplifier 120 is in its first condition, the capacitor 194 is charged through the resistors 192 and 193, and its voltage is applied to the input 124 via the resistor 195. The values of the capacitor 194 and the resistors 192 and 193 determine the speed at which this positive feedback is applied, and it is designed to be slow enough in operation so that very short excursions of the potential at the terminal 112 do not cause the amplifier 120 to latch in its first condition.

A normally open switch 196 is connected from ground to the junction of the resistors 192 and 193 to disable the positive feedback provided by this circuit, and reset the amplifier 120 to its second condition, provided the potential at the terminal 112 no longer exceeds the limit value.

The circuit for preventing random operation of the amplifier 120 includes a full wave rectifier comprising diodes 197 and 198 (FIG. 1) connected between the secondary of the transformer 58 and a capacitor 200, which is connected from the junction of the diodes 197 and 198 to ground. The voltage across the capacitor 200 is made available, via terminal 201, to the circuit of FIG. 2. The terminal 201 is connected through resistors 202 and 203 to ground, and the junction of the resistors 202 and 203 is applied to the gate of a field effect transistor (FET) 204. A capacitor 206 is connected between the source and drain terminals of the FET 204, and the drain of the FET 204 is connected through a resistor 208 to the line 154 which is connected with a source of negative voltage. The drain of the FET 204 is also connected through a resistor 210 to the gate of an FET 212. The drain of the FET 212 is connected directly to the noninverting input 124 of the operational amplifier 120. A diode 214 connects the source of the FET 212 to ground, and its source is also connected to a source of positive potential at terminal 79 through a resistor 216.

The FET's 204 and 212 are preferably N-channel FET's of the type that are conductive when no potential is applied to their gate terminals. A negative signal applied to the gate results in the FET being cut off.

In operation, the FET's 204 and 212 are normally cut off by means of the voltage developed across the capacitor 200 and the voltage across the capacitor 206, respectively. When the power is interrupted, however, the capacitor 200 is discharged through the resistors 202 and 203, permitting the FET 204 to become conductive. The capacitor 206 is thereupon discharged through the FET 204, raising the potential of the gate of the FET 212 and permitting the FET 212 also to become conductive. Accordingly, the terminal 79 is connected to the noninverting input 124 of the operational amplifier 120 through the FET 212 and the resistor 216. Diode 214 limits the potential at the source of FET 212 to the forward conductance voltage of the diode. Of course, since the power has been interrupted, the increased conduction of the FET 212 does not increase the signal at the terminal 124, since the power applied to the terminal 79 is also interrupted. However upon the resumption of the input power, the FET 212 permits a positive voltage from terminal 79 to be applied through the resistor 216 and the clamp of diode 214 to the noninverting input 124 of the amplifier 120, placing the operational amplifier 120 in its second condition. A short time after the power connection has been re-established, the capacitor 200 is charged, cutting off the FET 204, and thereafter the capacitor 206 is charged through the resistor 208, cutting off the FET 212. The interval during which the FET 212 is conductive following resumption of power is controllable partly by selecting the value of capacitance of the capacitor 206 and the value of resistance of the resistor 208. These components are selected to give a time interval of approximately one-half second to 4 seconds before the FET becomes nonconductive. This is sufficient time to permit the voltage levels throughout the control circuit to achieve their steady state values, after which the condition of the operational amplifier 120 is not subject to random variations. The FET 212 then becomes nonconductive again so that the operational amplifier 120 is free to operate in the normal manner, and will be operated whenever the limit condition is exceeded. The short time period of one-half to 4 seconds in which the output of the operational amplifier 120 may falsely indicate that no limit condition has occurred does not produce any adverse effects, partly because of the shortness of the interval, and also because the power interruption typically brings about a reduction in the value of the parameter whose limit was exceeded. Extremely short interruptions do not effect the circuit because of the time constant inherent in the circuit which includes the capacitor 200, and the resistors 202 and 203 through which the capacitor 200 is discharged following an interruption in power. If the power interruption is so short that the voltage level at the gate of the FET 204 does not pass the cutoff threshold, the capacitor 206 does not become discharged and the FET 212 remains nonconductive. In situations where it is desired to detect a low limit or for other applications, the drain of FET 212 may be coupled to the inverting input 122 of amplifier 120 rather than noninverting input 124.

Figure 3:
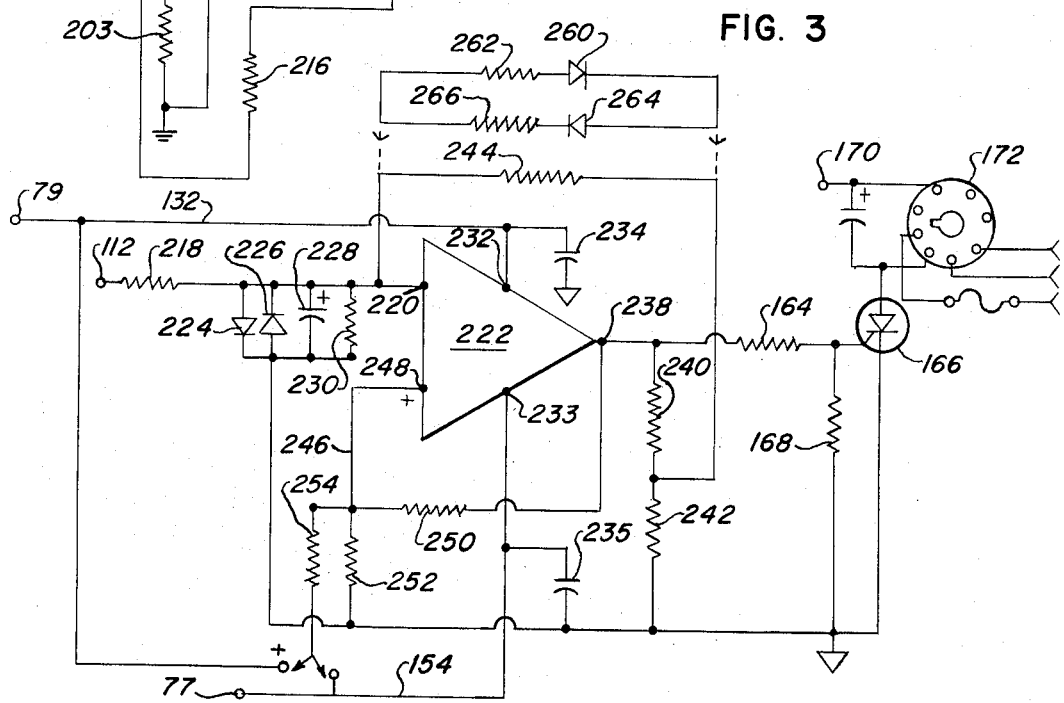
FIG. 3 is an illustration in schematic form of an additional portion of a second embodiment of the present invention, which cooperates with the apparatus of FIG. 1.

Referring now to FIG. 3, there is shown an alternative embodiment which, in combination with the apparatus of FIG. 1, is effective to produce an output signal in proportion to the amount of control desired. In particular, the range of temperatures over which the controller is operative may be defined as the span of the controller. The controller set point is within the span and is also located within a second range of temperatures defined as the proportional bandwidth. The proportional bandwidth is normally of a much smaller temperature range than the span. In one apparatus of FIG. 3, the bandwidth is two percent of the span. The controller output signal assumes a first state when the temperature sensed by thermocouple 12 is less than the temperatures included within the proportional bandwidth, and a second state when the sensed temperature is greater than the temperatures included within the proportional bandwidth. When the sensed temperature is within the proportional bandwidth, the controller output alternates between the two states, creating a square wave output having a duty cycle which is related to the magnitude of the difference between the sensed and set point temperatures. If the duty cycle is defined as the percentage of time the controller output assumes the first state, the duty cycle will decrease with increasing temperature. The controller may establish a linear relation between temperature within the proportional bandwidth and duty cycle, but nonlinear relationships are often desirable.

The apparatus of FIG. 3 is designed to be connected to the apparatus of FIG. 1, in place of the apparatus of FIG. 2 which has been described above. The input signal is made available at a terminal 112, and passes through a resistor 218 to the inverting input 220 of an operational amplifier 222. A pair of reverse-poled diodes 224 and 226 are connected between the input 220 and ground, for limiting. A capacitor 228 and a resistor 230 are connected in parallel between the inverting input 220 and ground. Positive potential is applied to the line 132 and a negative potential is applied to the line 154 to furnish the power required by the operational amplifier 222 at terminals 232 and 233 thereof, just as described in connection with FIG. 2. Also as described in connection with FIG. 2, capacitors 234 and 235 connect terminals 232 and 233, respectively, to ground.

The output is made available at an output terminal 238 and a voltage divider circuit including serially connected resistors 240 and 242 is connected between the terminal 238 and ground. The junction of the resistors 240 and 242 is connected via resistor 244 to the inverting input 220 of the amplifier 222 to furnish negative feedback. Positive feedback is supplied via a line 246 connecting the noninverting input 248 of the amplifier 222 to the junction of two resistors 250 and 252 which are connected in series from the terminal 238 to ground, to form a second voltage divider. A resistor 254 connects the noninverting input 248 to either the line 132 or the line 154 as may be required. Its value is selected to adjust the duty cycle of the controller output signal to a desired level when a zero level signal is applied to input 112, i.e., when the sensed temperature equals the set point temperature.

The output of the operational amplifier 222 is connected by means of the output resistor 164 to the gate of an SCR 166, just as is the circuit of FIG. 2. Like FIG. 2, the gate of the SCR 166 is connected to ground by a resistor 168, and is extinguished each half cycle by the a.c. voltage supplied to it via terminal 170.

The circuit of FIG. 3 forms an astable multivibrator in which a square wave is made available at the output terminal 238 when the input voltage at the terminal 112 is at ground potential. As mentioned, the duty cycle of that square wave is selected by altering the value of resistor 254. The oscillation of the circuit is caused by the capacitor 228. During one portion of each cycle, the capacitor 228 holds the potential of the terminal 220 at a positive value, providing negative output at the terminal 238 and corresponding to a first state of the controller output, but is charged negatively by negative feedback through the resistor 244. When the capacitor 228 attains sufficient negative charge, the state of conduction of the amplifier 222 is reversed, and a positive potential is produced at the output terminal 238 corresponding to a second state of the controller output. This in turn charges the capacitor 228 in a positive direction through the resistor 244 until the conduction state is reversed again. The amount of positive feedback through the resistor 250 determines how much the capacitor 228 must be charged in order to reverse the state of conduction.

When the voltage level at the input terminal 112 rises, the capacitor 228 tends to be charged in a positive direction through the resistor 218 so that less time is required, during a positive swing of the capacitor 228, before the state of conduction of the amplifier 222 is reversed. Similarly, more time is required during a negative swing to reverse the conduction state. As a result, the output signal available at the terminal 238 is asymmetrical and has a negative value for a greater time during each cycle than its positive value.

When the voltage level on the terminal 112 goes negative, the duty cycle of the amplifier unit 222 is modified in the opposite way to produce positive-going portions of greater duration during each cycle. The square wave thus produced causes the relay 176, connected in the same manner as shown in FIG. 2, to operate so as to execute its control function in a proportional way, being closed for a greater or lesser amount of time during each cycle, as required. If the actual temperature as measured by the thermocouple 12 (FIG. 1) differs sufficiently from the temperature set by the potentiometer 28, that the sensed temperature is outside the proportional bandwidth, the signal at terminal 238 will be continually positive (corresponding to a one hundred percent duty cycle) or continually negative (corresponding to a zero percent duty cycle), depending on whether the temperature is less or greater, respectively, than the set point. Thus, when the temperature is outside the proportional bandwidth, the duty cycle of the signal produced at the terminal 238 is shifted to its maximum extent, i.e., to either zero or one hundred percent. When the sensed temperature comes within the proportional bandwidth, the duty cycle is shifted and eventually a stable condition is reached when the desired temperature approximates the temperature set by the potentiometer 28.

There will, however, normally be some residual error remaining after the controller has stabilized. As will be recalled, the circuit constants associated with the apparatus of FIG. 3 were selected to give a desired duty cycle when the sensed temperature is equal to the set point temperature. However, in most instances, that selected duty cycle will not result in achievement of the set point temperature, but will result in some other temperature within the proportional bandwidth. Thus, the controller may stabilize at some temperature other than the set point temperature yielding a signal at terminal 112 other than zero and a duty cycle other than that desired. However, the temperature deviation from the set point is normally small, and may be made arbitrarily small by reducing the range of the proportional bandwidth, so that in many applications it is not a serious disadvantage.

Resistor 244 provides an approximately linear relationship between the deviation of the sensed temperature from the set point temperature and the duty cycle within the proportional bandwidth. An alternative feedback circuit is shown in FIG. 3. It includes a series diode 260 and resistor 262, and a series diode 264 and a resistor 266, connected in lieu of the resistor 244. The diodes 260 and 264 are reverse poled so that the rate of feedback current during alternate half cycles may be independently controlled by selecting appropriate values for the resistors 262 and 266. The independent feedback rates for alternate half cycles permit adjustment of the relative position of the set point within the proportional bandwidth. Further, the diodes may be used to create a nonlinear relationship between sensed temperature deviation and duty cycle.

In the circuit of FIG. 3, the proportional bandwidth of the controller may be adjusted by altering the value of resistor 218 and thus the rate of current flow between capacitor 228 and terminal 112. Decreasing the resistance of resistor 218 increases that current flow, reducing the relative effect of the feedback through resistor 244, thus decreasing the range of the proportional bandwidth. Conversely, increasing the value of resistor 218 will increase the proportional bandwidth. The relative cycle times, as exemplified by the period of the controller output at fifty percent duty cycle, may be adjusted by altering the values of resistors 240, 242, 244 or 250 or capacitor 228. Placing all of the relative timing adjustments of the controller in conjunction with one operational amplifier 222 aids in the stabilization of the controller operation with changes in such parameters as power supply voltages and ambient temperature.

In the foregoing, the control circuits of the present invention have been described particularly in relation to the control of temperature, and especially with a thermocouple as the temperature sensing device. However, it will be appreciated by those skilled in the art that the control circuitry of the present invention can also be employed to execute a control function in response to parameters other than temperature, and that another sensing device may be employed instead of a thermocouple.

While specific embodiments of the invention have been described, it will be obvious that certain modifications can be made without departing from the spirit of the invention, and it is intended to include such modifications within the scope of the invention.

What is claimed is:

1. A controller comprising a source of electrical power, thermocouple means, operational amplifier means connected to said source and to said thermocouple means and responsive to said thermocouple means for manifesting a first output signal when the temperature of said thermocouple means is below a predetermined limit, and a second output signal when the temperature of said thermocouple means is above said predetermined limit, sensing means connected to said source of power for sensing a restoration of power after an interruption thereof, and means for connecting said sensing means with said operational amplifier for forcing said amplifier to manifest said first output signal for a predetermined interval following said restoration.

2. A controller according to claim 1 wherein said sensing means comprises delay means having a time constant corresponding to said predetermined interval, and selectively conductive means connected to said delay means and responsive thereto to assume its conductive state during said predetermined interval.

3. A controller according to claim 1 wherein said sensing means comprises a first transistor connected to said power source, connecting means for connecting said first transistor to said operational amplifier to force said amplifier to assume its first condition when said first transistor is conductive, a first timing circuit connected with said power supply and with a control element of said first transistor, a second transistor connected with said power supply and with said first timing circuit for selectively disabling said first timing circuit when said second transistor becomes conductive, and a second timing circuit interconnected with said power supply and a control element of said second transistor to cause said second transistor to become nonconductive at a predetermined time following said restoration, said first timing circuit being responsive to the operation of said second transistor to cause said first transistor to become nonconductive at a predetermined time following the time when said second transistor becomes nonconductive.

4. A controller according to claim 3 wherein said second timing circuit comprises a resistor connected with said power supply, and a capacitor connected to said resistor and adapted to be charged by said power supply through said resistor, and means for connecting said capacitor and said resistor to the gate of said second transistor for disabling said second transistor at said predetermined time.

5. A controller comprising sensing means for producing an electrical signal in response to the value of a physical parameter, an output terminal, and means connected to said sensing means and responsive to said electrical signal for producing a proportional signal at said output terminal, said proportional signal having a duty cycle related to the deviation of the sensed level of said parameter from a preselected level over a given range of said parameter, said last named means comprising an operational amplifier, a first voltage divider connected to the output of said operational amplifier, means for connecting said first voltage divider to the inverting input of said amplifier for supplying negative feedback to said amplifier, a second voltage divider connected with the output of said amplifier, means for connecting said second voltage divider to the noninverting input of said amplifier for supplying positive feedback to said amplifier, and capacitor means connected between said inverting input and a source of reference potential.

6. A controller according to claim 5 wherein said negative feedback means comprises a first resistor connected in series with a first diode between said first voltage divider and said inverting input, and a second resistor connected in series with a second diode between said first voltage divider and said inverting input, said first and second diodes being connected in oppositely poled relationship.

7. A controller according to claim 5 including a source of a.c. power, a silicon controlled rectifier having its anode and cathode connected in series with said source, and means for connecting said output terminal to the gate terminal of said silicon controlled rectifier whereby a.c. current through said silicon controlled rectifier is controlled in response to said proportional signal.

8. A controller according to claim 5 wherein said sensing means includes thermocouple means for producing an electrical signal in response to the temperature of the junction of said thermocouple means, and
generating means connected to said thermocouple means and responsive to said electrical signal for producing an output signal,
said generating means including a source of regulated voltage,
a first adjustable voltage divider connected between said regulated voltage and a source of reference potential,
connecting means for connecting said first adjustable voltage divider to a first input of a differential amplifier,
a second adjustable voltage divider connected between said source of regulated voltage and said reference potential,
one terminal of said thermocouple means being connected with said second adjustable voltage divider and the other terminal of said thermocouple means being connected to the other input of said differential amplifier, whereby the differential in the potential of the two inputs to said differential amplifier is proportional to the temperature of said junction.

9. A controller according to claim 8 including a negative temperature coefficient resistor element connected in series with said second adjustable voltage divider, said resistor element being positioned adjacent the connection of said thermocouple means with said second voltage divider and the connection of said thermocouple means with said differential amplifier.

10. A controller according to claim 8 including a rheostat, said rheostat being connected across a portion of said second adjustable voltage divider, said rheostat establishing a range of potentials which may be selected by adjustment of said second voltage divider.

11. A controller comprising a source of electrical power, parameter sensing means, operational amplifier means connected to said source and to said parameter sensing means and responsive to said parameter sensing means for manifesting a first output signal when the parameter sensed by said parameter sensing means is below a predetermined limit, and a second output signal when the parameter sensed by said parameter sensing means is above said predetermined limit, power sensing means connected to said power source of power for sensing a restoration of power after an interruption thereof, and means for connecting said power sensing means with said operational amplifier for forcing said amplifier to manifest said first output signal for a predetermined interval following said restoration.

* * * * *